United States Patent Office 2,863,897
Patented Dec. 9, 1958

2,863,897

METHOD OF PREPARING HYDROXYL END-BLOCKED ORGANOPOLYSILOXANE FLUIDS

Jack R. Wehrly, Midland, Mich., assignor to Dow Corning Corporation, Midland, Mich., a corporation of Michigan No Drawing. Application June 23, 1955
Serial No. 517,660

8 Claims. (Cl. 260—448.2)

This invention relates to the preparation of hydroxylated siloxane fluids.

Organopolysiloxane fluids having silicon bonded hydroxyl groups on the ends of the molecular chains have found considerable utility in the organosilicon industry. Previous methods of preparing such materials have not been satisfactory for making fluids in the viscosity range from 200 to 100,000 cs. One previous method is that described in U. S. Patent 2,607,792, which comprises heating siloxanes in an autoclave with steam at temperatures from 200 to 400° C. This is an excellent method for preparing low molecular weight materials but the fluids obtained thereby inherently have viscosities less than 100 cs.

Another previously employed method was that of hydrolyzing hydrolyzable silanes under conditions where some of the hydroxyl groups remained uncondensed. This method suffers from the disadvantages of producing large amounts of cyclic siloxanes which contaminate the hydroxylated fluid and also of lacking in control over the viscosity of the hydroxyl fluids obtained.

It is the object of the present invention to provide an economically feasible method of preparing hydroxylated organosiloxane fluids. Another object is to provide a method for preparing such fluids which gives a large measure of control over the viscosity of the final product. Other objects and advantages will be apparent from the following description.

In accordance with this invention a mixture of a siloxane of the unit formula $$R_n SiO_{\frac{4-n}{2}}$$

in which R is a monovalent hydrocarbon radical and $n$ has an average value from 1.9 to 2 inclusive, water and a nitrile of the formula R'CN in which R' is an alkyl radical of less than 4 carbon atoms, is heated in a closed system in the presence of a catalyst of the group quaternary ammonium hydroxides, alkali metal hydroxides, alkali metal salts of organosilanols and quanternary ammonium salts of organosilanols at a temperature below 175° C. until the desired viscosity of the siloxane is obtained.

Applicant has found that when the above mixture of materials is heated in the prescribed temperature range, scission of the siloxane linkage occurs with the introduction of hydroxyls into the siloxane molecule. This reaction is reversible since in the presence of alkali there is a great tendency of silanol hydroxyls to condense to give siloxane linkages. Consequently the end product of the process of this invention is the result of an equilibrium which may be represented schematically as follows:

$$\equiv SiOSi\equiv + H_2O \rightleftharpoons 2\equiv SiOH$$

The overall reaction may be represented by the equation:

$$(R_2SiO)_x + H_2O \rightleftharpoons HO[\overset{R_2}{Si}O]_xH$$

The value of $x$ in the product will depend upon the concentration of water relative to the concentration of the starting siloxane. The lower the concentration of water the greater will be the value of $x$ and hence the higher the viscosity of the end product.

The conditions of this invention greatly favor the formation of the hydroxylated siloxanes over the reverse condensation reaction. This is true because the reaction is carried out in a closed system thereby preventing escape of water by volatilization and because a mutual solvent for the water and siloxane is used so that the water is at all times in intimate contact with the siloxane.

The siloxane employed in the method of this invention can be of any viscosity. As the reaction proceeds the viscosity of the starting siloxane may either increase or decrease depending upon the original viscosity and the amount of water present. Thus if the starting siloxane is say a cyclic tetramer the viscosity will increase until equilibrium is obtained. If the starting siloxane is a non-flowing gum and the amount of water employed is such as to call for a lower viscosity, the viscosity will decrease during reaction due to degradation of long chains by the introduction of hydroxyls.

The siloxanes employed in this invention are primarily diorganosiloxanes of the unit formula $R_2SiO$ which may contain up to 10 mol percent copolymerized monoorganosiloxanes of the unit formula $RSiO_{3/2}$. For the purpose of this invention R can be any monovalent hydrocarbon radical such as alkyl radicals such as methyl, ethyl and octadecyl; alkenyl radicals such as vinyl, allyl and hexenyl; cycloaliphatic radicals such as cyclohexyl and cyclohexenyl; aromatic hydrocarbon radicals such as phenyl, tolyl, xenyl and naphthyl and aralkyl hydrocarbon radicals such as benzyl.

The nitriles employed in this invention are acetonitrile, propionitrile and butyronitrile. The nitriles should be employed in an amount of at least 1% by weight based on the weight of the siloxane. The upper limit of the amount of nitrile is not critical.

The amount of water employed in the method of this invention is not critical although when more than 1 mol of water per prime mol of siloxane is employed there is no advantage. In general, the amount of water employed should be regulated according to the viscosity of the final product desired. The relationship between the amounts of water and viscosity for dimethylpolysiloxanes is shown below. It should be understood that these relationships are not critical as far as the production of hydroxylated siloxanes is concerned but merely illustrate the degree of control possible with the process of this invention.

The preferred amounts of water and nitrile used are those which give a homogeneous system at the reaction temperature chosen. Under these conditions the reaction proceeds at the fastest rate and with the least amount of side reactions. If, for example, the amount of water employed is such that a two-phase system results, that portion of the water in the aqueous phase is not efficient for the introduction of hydroxyl groups into the siloxane since it is not in intimate contact with the latter. Consequently whereas two-phase systems may be employed if desired, they represent an uneconomical condition.

The alkali catalyst employed in the reaction of this invention can be any alkali metal hydroxide or any alkali metal salt of an organosilanol or any quaternary ammonium hydroxide or any quaternary ammonium salt of an organosilanol. The amount of catalyst employed should range from 1 alkali molecule per 60,000 silicon atoms to 1 alkali molecule per 100 silicon atoms. When the amount of alkali exceeds the latter, side reactions occur due to the hydrolysis of the nitrile and due to cleavage of the organic groups attached to the silicon atom. If the amount of alkali is below 1 alkali moleule per 60,000 silicon atoms the reaction will not proceed at a reasonable rate.

Specific examples of alkali metal hydroxides which can be used as catalysts in the process of this invention are lithium, potassium, sodium and cesium hydroxides. Specific examples of operative alkali metal salts of silanols are those of the formula $R_3SiOLi$, $KO[R_2SiO]K$ and $RSiOONa$ in which salts R can be any monovalent hydrocarbon radical such as methyl, ethyl, phenyl, xenyl, vinyl, cyclohexyl, tolyl and benzyl.

Specific examples of quaternary ammonium hydroxides which are operative are:

Tetramethylammonium hydroxide
Tetraethylammonium hydroxide
Phenyltrimethylammonium hydroxide
Triethyloctadecylammonium hydroxide
Benzyltrimethylammonium hydroxide
Cyclohexyltributylammonium hydroxide
Vinyltrimethylammonium hydroxide
Benzyl β-hydroxyethyldimethylammonium hydroxide
Tolyltriethylammonium hydroxide
Tris-(β-hydroxyethyl)methylammonium hydroxide
12-hydroxyoctadecyltrimethylammonium hydroxide
Hydroxyphenyltriethylammonium hydroxide
Hydroxycyclohexyltributylammonium hydroxide
Hydroxyphenylhydroxyethyldimethylammonium hydroxide, and
Hydroxyphenylbenzyldibutylammonium hydroxide The catalyst can also be any quaternary ammonium salt of any organosilanol such as salts of the formula $R_3SiONR''_4$, $R''_4NO[R_2SiO]XNR''_4$ and $RSiOONR''_4$ in which R can be any monovalent hydrocarbon radical such as those above defined and $R''$ can be any organic radical such as, for example, the hydrocarbon and hydroxylated hydrocarbon radicals shown in the above list of quaternary ammonium hydroxides.

The reaction of this invention must be carried out in a closed system to prevent escape of water and should be carried out at a temperature below 175° C. and preferably below 150° C. These conditions give a satisfactory reaction time and minimize or eliminate cleavage of the hydrocarbon groups from the silicon. The latter reaction occurs quite readily when siloxanes are heated above 175° C. in the presence of aqueous alkali and occur at an appreciable rate even under the conditions of the present application in the absence of the nitrile solvent. This seems to be true because the nitrile facilitates reaction of the water with the siloxane without facilitating group cleavage. As a consequence the process of this invention is unexpectedly beneficial for the production of hydroxylated siloxanes.

The method of this invention lends itself quite well to the continuous production of hydroxylated fluids. That is, the reactants can be continuously added to one end of a closed system and continuously removed from the other end. In this case the contact time in the reactor should be sufficient to allow the siloxane to come to the desired viscosity.

The products made by the method of this invention are useful in the water repelling of fabrics.

The following examples are illustrative only and should not be construed as limiting the invention which is properly delineated in the appended claims.

EXAMPLE 1

A mixture of 148 g. of mixed cyclic dimethylsiloxanes, 15 g. of acetonitrile, .2018 g. of water and the salt $KO(Me_2SiO)_2K$ in amount to give 1 potassium atom per 10,000 silicon atoms was heated in a closed container at 80° C. for 2 days. The resulting product was a hydroxyl end-blocked dimethylpolysiloxane fluid having a viscosity of 16,200 cs.

A sample of this fluid was heated with lead octoate and no gelation occurred indicating that no groups were cleaved during reaction with the water.

EXAMPLE 2

A mixture of 156.2 g. of mixed cyclic siloxanes containing 7.5 mol percent phenylmethylsiloxane and 92.5 mol percent dimethylsiloxane, 15 g. of acetonitrile, .15 g. of water and the salt $NaO(Me_2SiO)_2Na$ in amount to give 1 sodium atom per 5,000 silicon atoms, was heated in a closed container at 100° C. for 48 hours. The resulting product had a viscosity of 12,100 cs. and it did not gel when heated with lead octoate indicating that no groups were cleaved during the reaction with water.

EXAMPLE 3

This example illustrates the change in viscosity of the product with the change in the amount of water employed during the reaction. In each of the 8 runs shown below a mixture of 148 g. of mixed cyclic dimethylsiloxanes, 15 g. of acetonitrile, the salt $NaO(Me_2SiO)_2Na$ in amount to give 1 sodium atom per 10,000 silicon atoms and the amount of water shown below was heated in a closed container at 100° C. for 22 hours. The viscosity of the resulting product together with the percent by weight of hydroxyls is shown in the table below.

*Table*

| Mols of water per mol of $Me_2SiO$ | Percent by weight hydroxyl in product | Viscosity of product in cs. at 25° C. |
|---|---|---|
| .00964 | .182 | 2,870 |
| .00783 | .152 | 5,360 |
| .00689 | .168 | 6,099 |
| .00529 | .146 | 13,400 |
| .00424 | .145 | 17,300 |
| .00314 | .136 | 26,000 |

EXAMPLE 4

A mixture of 148 g. of cyclic dimethylsiloxanes, .9115 g. of water, 15 g. of acetonitrile and .39 g. of $$NaO(Me_2SiO)_2Na$$

(1 Na per 500 Si) was heated at 110° C. for 24 hours. The resulting product had a viscosity of 551 cs. and was composed of hydroxyl end-blocked dimethylpolysiloxane molecules.

EXAMPLE 5

A mixture of 148 g. of mixed dimethylsiloxane cyclics, .1725 g. of water, 15 g. of butyronitrile, .0308 g. of the salt $NaO(Me_2SiO)_2Na$ was heated in a closed system at 110° C. for 24 hours. The resulting hydroxyl end-blocked dimethylsiloxane fluid had a viscosity of 2,670 cs. It showed no gelation upon heating with lead octoate.

This run was repeated using propionitrile and the resulting product was a hydroxyl end-blocked dimethylpolysiloxane having a viscosity of 316 cs. It showed no indication of gelling when heated with lead octoate.

An identical run employing toluene as the solvent showed no increase in viscosity indicating no reaction.

EXAMPLE 6

A mixture of 133.7 g. of tetramethyltetraethylcyclotetrasiloxane, .152 g. of water, .10162 g. of the sodium salt of Example 5 and 15 g. of acetonitrile was heated in a closed system at 100° C. for 24 hours. The resulting product was an ethylmethylpolysiloxane fluid having a viscosity of 2,790 cs. and a hydroxyl content of .114% by weight.

EXAMPLE 7

A mixture of 128.6 g. of pentamethylpentavinylcyclopentasiloxane, .1498 g. of water, .0159 g. of the salt of Example 5 and 15 g. of acetonitrile was heated in a closed system at 110° C. for 24 hours. The resulting product was a methylvinylpolysiloxane fluid having a viscosity of 4,070 cs. and a hydroxy content of .148% by weight.

EXAMPLE 8

A mixture of 37.1 g. of octaethylcyclotetrasiloxane, .0155 g. of the salt of Example 5, .0424 g. of water and 108 g. of acetonitrile was heated in a closed system at 110° C. for 5 days. The resulting product was a hydroxyl end-blocked diethylpolysiloxane having a viscosity of 8,330 cs.

EXAMPLE 9

Equivalent results are obtained when lithium hydroxide is employed as the catalyst in the procedure of Example 2 except that the temperature employed is 120° C.

EXAMPLE 10

A mixture of 138 g. of a 57 cs. cohydrolyzed methylsiloxane fluid having a composition of 99.99 mol percent dimethylsiloxane and .01 mol percent monomethylsiloxane, .7746 g. of water, .0329 g. of the salt of Example 5 and 15 g. of acetonitrile was heated at 110° C. for 24 hours. The resulting product was a hydroxylated methylcopolymeric siloxane fluid having a viscosity of 586 cs.

EXAMPLE 11

A mixture of 148 g. of mixed cyclic dimethylsiloxanes, 15 g. of acetonitrile, .17 g. of water and .0866 g. of the salt $Et_4NO(Me_2SiO)_2NEt_4$ (about 1 N per 500 Si) was heated in a closed container 1.8 hours at 108° C.

The resulting material was neutralized with $CO_2$ and divided into two parts. One part was heated in an open container 64 hours at 108° C. The resulting product had a viscosity of 70,750 cs.

The other part was placed under reduced pressure for 64 hours to remove volatiles. The resulting product had a viscosity of 51,161 cs.

Both of these dimethylpolysiloxane fluids had hydroxyl groups on the end of the molecules.

EXAMPLE 12

Equivalent results are obtained when the following quaternary ammonium hydroxides are employed in the method of Example 11:

Phenyltrimethylammonium hydroxide
Benzyltrimethylammonium hydroxide
Vinyltrimethylammonium hydroxide
Tri-($\beta$-hydroxyethyl)methylammonium hydroxide
Triethyloctadecylammonium hydroxide, and
Hydroxycyclohexyltributylammonium hydroxide That which is claimed is:

1. A method which comprises heating in a closed system a mixture of (1) an organosiloxane of the unit formula $$R_nSiO_{\frac{4-n}{2}}$$

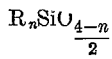

in which R is a monovalent hydrocarbon radical and $n$ has an average value from 1.9 to 2 inclusive, (2) water, (3) a nitrile of the formula R'CN where R' is an alkyl radical of less than 4 carbon atoms, in amount of at least 1% by weight based on the weight of the organosiloxane and (4) a catalyst selected from the group consisting of alkali metal salts of organosilanols, alkali metal hydroxides, quaternary ammonium hydroxides and quaternary ammonium salts of organosilanols, in amount such that there is from 1 alkali molecule per 60,000 silicon atoms to 1 alkali molecule per 100 silicon atoms, at a temperature below 175° C. whereby an hydroxylated organosiloxane fluid of desired viscosity is obtained.

2. The method comprising heating in a closed system (1) a methylsiloxane having an average of from 1.9 to 2 inclusive methyl radicals per silicon atom, (2) water, (3) acetonitrile in amount of at least 1% by weight based on the weight of the siloxane and (4) an alkali metal salt of an organosilanol in amount such that there is from 1 alkali metal atom per 60,000 silicon atoms to 1 alkali metal atom per 100 silicon atoms at a temperature below 175° C. whereby an hydroxylated methylsiloxane fluid of desired viscosity is obtained.

3. The method comprising heating in a closed system (1) a methylsiloxane having an average of from 1.9 to 2 inclusive methyl radicals per silicon atom, (2) water, (3) acetonitrile and (4) an alkali metal hydroxide in amount of from 1 alkali metal atom per 60,000 silicon atoms to 1 alkali metal atom per 100 silicon atoms at a temperature of less than 175° C. whereby an hydroxylated methylsiloxane fluid of desired viscosity is obtained.

4. A method which comprises heating in a closed system a mixture of (1) an organosiloxane of the unit formula $$R_nSiO_{\frac{4-n}{2}}$$

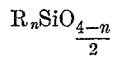

in which R is a monovalent hydrocarbon radical and $n$ has an average value from 1.9 to 2 inclusive, (2) water, (3) a nitrile of the formula R'CN where R' is an alkyl radical of less than 4 carbon atoms in amount of at least 1% by weight based upon the weight of the siloxane and (4) a catalyst selected from the group consisting of alkali metal salts of organosilanols, alkali metal hydroxides, quaternary ammonium hydroxides and quaternary ammonium salts of organosilanols in amount such that there is from 1 alkali molecule per 60,000 silicon atoms to 1 alkali molecule per 100 silicon atoms at a temperature below 150° C. whereby an hydroxylated organosiloxane fluid of desired viscosity is obtained.

5. The method comprising heating in a closed system (1) a methylsiloxane having an average of from 1.9 to 2 inclusive methyl radicals per silicon atom, (2) water, (3) acetonitrile in amount of at least 1% by weight based on the weight of the siloxane and (4) an alkali metal salt of an organosilanol in amount such that there is from 1 alkali metal atom per 60,000 silicon atoms to 1 alkali metal atom per 100 silicon atoms at a temperature below 150° C. whereby an hydroxylated methylsiloxane fluid of desired viscosity is obtained.

6. The method comprising heating in a closed system (1) a methylsiloxane having an average of from 1.9 to 2 inclusive methyl radicals per silicon atom, (2) water, (3) acetonitrile and (4) an alkali metal hydroxide in amount of from 1 alkali metal atom per 60,000 silicon atoms to 1 alkali metal atom per 100 silicon atoms at a temperature of less than 150° C. whereby an hydroxylated methylsiloxane fluid of desired viscosity is obtained.

7. The method of claim 1 where the mixture is homogeneous.

8. The method of claim 2 where the mixture is homogeneous.

References Cited in the file of this patent

UNITED STATES PATENTS

| 2,443,353 | Hyde et al. | June 15, 1948 |
| 2,567,110 | Hyde | Sept. 4, 1951 |
| 2,634,284 | Hyde | Apr. 7, 1953 |

FOREIGN PATENTS

| 123,239 | Australia | Sept. 18, 1947 |